(12) United States Patent
Zhang et al.

(10) Patent No.: US 12,243,240 B2
(45) Date of Patent: Mar. 4, 2025

(54) APPARATUS AND METHOD WITH MULTI-IMAGE PANOPTIC SEGMENTATION

(71) Applicant: Samsung Electronics Co., Ltd., Suwon-si (KR)

(72) Inventors: Hui Zhang, Beijing (CN); Pingjun Li, Beijing (CN); Byung In Yoo, Seoul (KR); Hana Lee, Suwon-si (KR); Yi Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 17/525,213

(22) Filed: Nov. 12, 2021

(65) Prior Publication Data
US 2022/0156944 A1 May 19, 2022

(30) Foreign Application Priority Data

Nov. 13, 2020 (CN) .......................... 202011272161.8
Sep. 30, 2021 (KR) ........................ 10-2021-0130042

(51) Int. Cl.
*G06T 7/174* (2017.01)
*G06F 16/71* (2019.01)
(Continued)

(52) U.S. Cl.
CPC .............. *G06T 7/174* (2017.01); *G06F 16/71* (2019.01); *G06F 18/253* (2023.01); *G06T 7/20* (2013.01);
(Continued)

(58) Field of Classification Search
CPC ........... G06T 2207/10016; G06T 2207/30168; G06T 5/50; G06T 7/10; G06T 7/174; G06V 20/40
See application file for complete search history.

(56) References Cited

U.S. PATENT DOCUMENTS 10,430,946 B1 * 10/2019 Zhou .................. A61B 5/02007
10,671,082 B2   6/2020 Huang et al.
(Continued)

FOREIGN PATENT DOCUMENTS

CN   107483920 A * 12/2017 ............. H04N 17/00
CN   111428726 B  *  9/2020
(Continued)

OTHER PUBLICATIONS

Liu et al., An End-to-End Network for Panoptic Segmentation, 2019 IEEE/CVF Conference on Computer Vision and Pattern Recognition (CVPR), doi.org/10.48550/arXiv.1903.05027, pp. 6165-6174.*
(Continued)

*Primary Examiner* — Guillermo M Rivera-Martinez
(74) *Attorney, Agent, or Firm* — NSIP Law

(57) ABSTRACT

A processor-implemented method with video processing includes: determining a first image feature of a first image of video data and a second image feature of a second image that is previous to the first image; determining a time-domain information fusion processing result by performing time-domain information fusion processing on the first image feature and the second image feature; and determining a panoptic segmentation result of the first image based on the time-domain information fusion processing result.

19 Claims, 8 Drawing Sheets

(51) Int. Cl.
  *G06F 18/25* (2023.01)
  *G06T 7/20* (2017.01)
  *G06V 10/22* (2022.01)
  *G06V 10/40* (2022.01)
(52) U.S. Cl.
  CPC .............. *G06V 10/22* (2022.01); *G06V 10/40* (2022.01); *G06T 2207/10016* (2013.01); *G06T 2207/20081* (2013.01)

(56) References Cited

U.S. PATENT DOCUMENTS

| | | | |
|---|---|---|---|
| 2017/0287170 A1 | 10/2017 | Perona et al. | |
| 2018/0115706 A1* | 4/2018 | Kang | G06T 5/70 |
| 2019/0244060 A1* | 8/2019 | Dundar | G06T 15/00 |
| 2020/0151497 A1* | 5/2020 | Kojima | G06F 18/2431 |
| 2020/0242804 A1 | 7/2020 | Eisenmann et al. | |
| 2020/0250442 A1 | 8/2020 | Kim et al. | |
| 2020/0267407 A1 | 8/2020 | Sychev | |
| 2020/0356862 A1* | 11/2020 | Linsley | G06N 3/084 |
| 2021/0326638 A1* | 10/2021 | Lee | G06V 20/46 |
| 2021/0334976 A1* | 10/2021 | Lee | G06N 3/045 |

FOREIGN PATENT DOCUMENTS

| | | |
|---|---|---|
| KR | 2008-0108883 A | 12/2008 |
| KR | 10-1241813 B1 | 3/2013 |
| KR | 10-2036136 B1 | 10/2019 |
| KR | 10-2099286 B1 | 4/2020 |

OTHER PUBLICATIONS

Kirillov et al., Panoptic Segmentation, 2019 IEEE/CVF Conference on Computer Vision and Pattern Recognition (CVPR), doi.org/10.48550/arXiv.1801.00868, pp. 9396-9405.*

Kim et al., Video Panoptic Segmentation, 2020 IEEE/CVF Conference on Computer Vision and Pattern Recognition (CVPR), doi.org/10.48550/arXiv.2006.11339, pp. 9856-9865.*

Li et al., Weakly- and Semi-Supervised Panoptic Segmentation, doi.org/10.48550/arXiv.1808.03575, pp. 1-28.*

Wang, Huiyu et al. "Axial-DeepLab: Stand-Alone Axial-Attention for Panoptic Segmentation" *arXiv:2003.07853v2* Aug. 6, 2020 (26 pages in English).

* cited by examiner

APPARATUS AND METHOD WITH MULTI-IMAGE PANOPTIC SEGMENTATION

CROSS-REFERENCE TO RELATED APPLICATIONS

This application claims the benefit under 35 USC 119(a) of Chinese Patent Application No. 202011272161.8, filed on Nov. 13, 2020 in the China National Intellectual Property Administration, and Korean Patent Application No. 10-2021-0130042, filed on Sep. 30, 2021 in the Korean Intellectual Property Office, the entire disclosures of which are incorporated herein by reference for all purposes.

BACKGROUND

1. Field

The following description relates to an apparatus and method with video processing.

2. Description of Related Art

Image panoptic segmentation is a process of assigning label information to each pixel of a two-dimensional (2D) image. Image content may be divided into two categories: one is "non-fixed stuff", which is content that does not need to be distinguished from other objects, such as grass, sky, buildings, and the like, and the other is a "fixed thing", which is content that needs to be distinguished from other objects, such as people, vehicles, and the like.

A panoptic segmentation operation may be regarded as a composite operation of two operations, that is, semantic segmentation and instance segmentation. In the case of a pixel belonging to the stuff category, a semantic label thereof is predicted, and in the case of a pixel belonging to the thing category, an instance label thereof is predicted.

Video panoptic segmentation is an extension of image panoptic segmentation on a time domain. In addition to panoptic segmentation of each image, an operation of tracking an object, that is, an operation of needing to assign the same label to pixels belonging to the same instance in different images is also combined. Typical video panoptic segmentation technologies are expensive, are slowly performed, and have a low accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with video processing includes: determining a first image feature of a first image of video data and a second image feature of a second image that is previous to the first image; determining a time-domain information fusion processing result by performing time-domain information fusion processing on the first image feature and the second image feature; and determining a panoptic segmentation result of the first image based on the time-domain information fusion processing result.

The determining of the panoptic segmentation result of the first image based on the time-domain information fusion processing result may include: determining an instance correspondence between frames of the first image by performing instance tracking on the first image based on the time-domain information fusion processing result; and determining the panoptic segmentation result of the first image based on the instance correspondence between the frames of the first image.

The determining of the panoptic segmentation result of the first image based on the time-domain information fusion processing result may include performing semantic segmentation, instance segmentation, and bounding box refinement on the first image based on the time-domain information fusion processing result to determine a semantic segmentation result of the first image, an instance segmentation result of the first image, and a bounding box of the first image, and the determining of the panoptic segmentation result of the first image based on the instance correspondence between the frames of the first image may include fusing the semantic segmentation result of the first image, the instance segmentation result of the first image, the bounding box of the first image, and the instance correspondence between the frames of the first image to determine the panoptic segmentation result of the first image.

The determining of the first image feature of the first image and the second image feature of the second image may include extracting features for each of the first image and the second image through a feature extraction network to determine the first image feature of the first image and the second image feature of the second image.

The time-domain information fusion processing result may include a first time-domain integration feature of the first image and a second time-domain integration feature of the second image.

The determining of the time-domain information fusion processing result by performing the time-domain information fusion processing on the first image feature and the second image feature may include: performing a combination operation on the first image feature and the second image feature; dividing combined image features into two paths and performing correlation processing on a first path; performing an elementwise addition operation on a second path and a result of the correlation processing of the first path; and determining the time-domain information fusion processing result based on an elementwise addition operation result.

The dividing of the combined image features into the two paths and performing of the correlation processing on the first path may include: performing one or more convolution operations on the first path; and performing correlation processing through a spatial-domain fusion network by inputting the convoluted first path to the spatial-domain fusion network.

The performing of the correlation processing through the spatial-domain fusion network may include: dividing features input to the spatial-domain fusion network by two or more paths and extracting subdomains for a portion of or all of the two or more paths; performing a matrix multiplication operation on a subdomain extraction result; and performing an elementwise addition operation on a result of the matrix multiplication operation and the features input to the spatial-domain fusion network.

The performing of the correlation processing through the spatial-domain fusion network may include: dividing convoluted combination features into four paths; extracting subdomains for each of a first path, a second path, and a third path among the four paths; performing a matrix multiplication operation on a subdomain extraction result of the first path and a subdomain extraction result of the second path among the four paths, and performing a matrix multiplication operation on a result of the matrix multiplication operation and a subdomain extraction result of the third path among the four paths; and performing an elementwise addition operation on a fourth path among the four paths and a result of the matrix multiplication operation for the subdomain extraction result of the third path.

The extracting of the subdomains may include extracting the subdomains through data reconstruction.

The performing of the combination operation on the first image feature and the second image feature may include: performing one or more convolution operations on the first image feature; performing one or more convolution operations on the second image feature; and performing a combination operation on the convoluted first image feature and the convoluted second image feature.

The determining of the time-domain information fusion processing result based on the elementwise addition operation result may include: dividing the elementwise addition operation result into two paths; performing one or more convolution operations on a result of an elementwise addition operation of each of the two paths; determining a first time-domain integration feature by performing an elementwise addition operation on the convoluted first image feature and an elementwise addition operation result of the convoluted first path; and determining a second time-domain integration feature by performing an elementwise addition operation on the convoluted second image feature and an elementwise addition operation result of the convoluted second path.

The determining of the time-domain information fusion processing result based on the elementwise addition operation result may include performing one or more convolution operations on the elementwise addition operation result, and using addition operation results for each convoluted element and the second image feature as the time-domain information fusion processing result.

The determining of the instance correspondence between the frames of the first image by performing the instance tracking on the first image based on the time-domain information fusion processing result may include: updating an instance database of the video data based on second time-domain integration features; and performing instance tracking for each of first time-domain integration features based on the updated instance database.

The updating of the instance database of the video data based on the second time-domain integration features may include: selecting a first number of preset features from the second time-domain integration features; and adding the selected first number of preset features to the instance database of the video data.

The performing of the instance tracking for each of the first time-domain integration features based on the updated instance database may include: selecting a second number of preset features from the first time-domain integration features; and performing an instance correspondence through a tracking network based on the selected second number of preset features and the updated instance database.

The preset features may include any one or any combination of any two or more of a region of interest (ROI) feature, a feature expressed based on a bounding box, and a feature expressed based on a mask.

In another general aspect, one or more embodiments include a non-transitory computer-readable storage medium storing instructions that, when executed by a processor, configure the processor to perform any one, any combination, or all operations and methods described herein.

In another general aspect, an apparatus with video processing includes: one or more processors configured to: determine a first image feature of a first image of video data and a second image feature of a second image that is previous to the first image; determine a time-domain information fusion processing result by performing time-domain information fusion processing on the first image feature and the second image feature; and determine a panoptic segmentation result of the first image based on the time-domain information fusion processing result.

For the determining of the panoptic segmentation result, the one or more processors may be configured to: determine an instance correspondence between frames of the first image by performing instance tracking on the first image based on the time-domain information fusion processing result; and determine the panoptic segmentation result of the first image based on the instance correspondence between the frames of the first image.

In another general aspect, a processor-implemented method with video processing includes: determining a combined feature map based on a first feature map of a first image and a second feature map of a second image, wherein the images are of an image sequence; determining a correlation feature map based on the combined feature map using a spatial fusion network; performing elementwise addition between the combined feature map and the correlation feature map; determining a first time-domain integration feature map based on the first feature map and a result of the elementwise addition, and a second time-domain integration feature map based on the second feature map and a result of the elementwise addition; and determining a panoptic segmentation result of the first image based on the first and second time-domain integration feature maps.

The determining of the correlation feature map may include extracting two or more subdomains from the combined feature map and determining the correlation feature map based on the two or more subdomains.

The panoptic segmentation result may include a panorama label map.

Other features and aspects will be apparent from the following detailed description, the drawings, and the claims.

Figure 1:
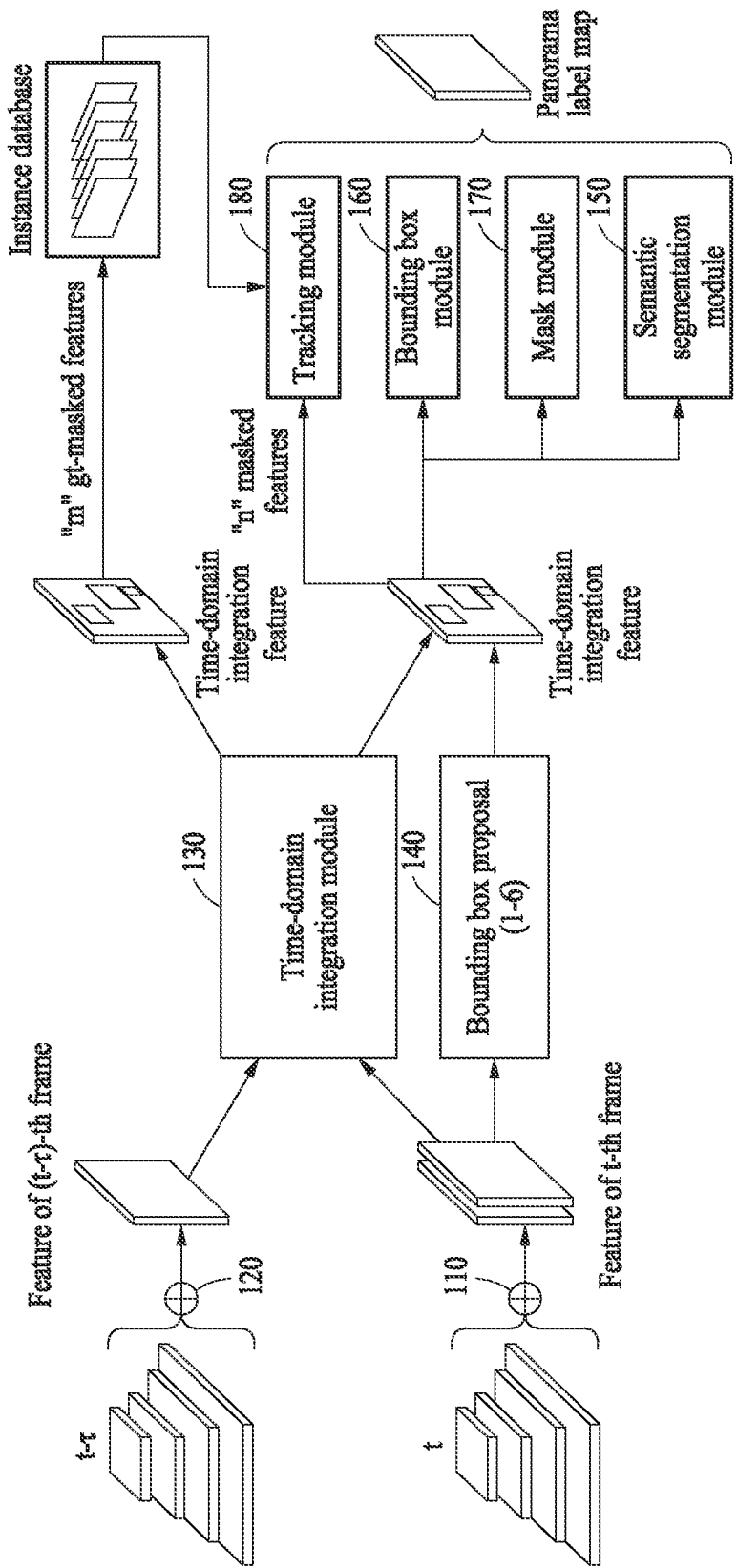
FIG. 1 illustrates an example of a network structure of a video processing model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The terminology used herein is for the purpose of describing particular examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, and/or combinations thereof, but do not preclude the presence or addition of one or more other features, integers, steps, operations, elements, components and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein, including technical and scientific terms, have the same meaning as commonly understood consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are used only to distinguish one member, component, region, layer, or section from another member, component, region, layer, or section. For example, a "first" member, component, region, layer, or section referred to in examples described herein may also be referred to as a "second" member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of a network structure of a video processing model.

Referring to FIG. 1, a network structure of a video processing model may include a feature extraction network 110, a feature extraction network 120, a time-domain integration module (TUM) 130, a bounding box proposal network (RPN) 140, a semantic segmentation module 150, a bounding box module 160, a mask module 170, and a tracking module 180.

A feature map of a t-th frame and a feature map of a (t−τ)-th frame extracted from the feature extraction networks 110 and 120, respectively, may be input to the time-domain integration module 130. The time-domain integration module 130 may output a t-th frame time-domain integration feature map and a (t−τ)-th frame time-domain integration feature map (that is, a feature suitable for matching).

The video processing model may add "m" masked features extracted from the (t−τ)-th frame time-domain integration feature map to an instance database, and may input "n" masked features extracted from the t-th frame time-domain integration feature map together with the instance database to the tracking module 180 to construct an instance correspondence between frames. Here, the masked features may be features displayed based on a mask.

The t-th frame time-domain integration feature map may also be input to the semantic segmentation module 150, the bounding box module 160, and the mask module 170.

Output results of the semantic segmentation module 150, the bounding box module 160, the mask module 170, and the tracking module 180 may be combined into a t-th frame panorama label map.

For example, for the t-th frame, the feature extraction network 110 may extract image features (indicating various resolutions as a pyramid, for example) of multiple resolutions using a general feature extraction network, and may obtain (or determine) a t-th frame feature map by fusing the extracted image features.

For the (t−τ)-th frame, the feature extraction network 120 may extract image features of multiple resolutions using the same feature extraction network as the feature extraction network 110 and may obtain a (t−τ)-th frame map by fusing the extracted image features. In a non-limiting example, the feature extraction network 110 and the feature extraction network 120 are a same network.

The time-domain integration module 130 may receive a feature of the t-th frame and a feature of the (t−τ)-th frame and may obtain a t-th frame time-domain integration feature map (including a feature suitable for matching) and a (t−τ)-th frame time-domain integration feature map based on the received features.

The bounding box proposal network 140 may apply a bounding box proposal network (RPN) to the t-th frame time-domain integration feature map to obtain candidate bounding boxes (for example, boxes on a time-domain integration feature map).

The semantic segmentation module 150 may perform semantic segmentation on the t-th frame time-domain integration feature map obtained from the time-domain integration module 130 to obtain semantic labels of all pixels.

The bounding box module 160 may refine the candidate bounding boxes obtained from the bounding box proposal network 140 in the t-th frame time-domain integration feature map obtained from the time-domain integration module 130, to verify a type and an accurate bounding box location thereof.

The mask module 170 may calculate a mask for the candidate bounding box obtained from the bounding box proposal network 140 in the t-th frame time-domain integration feature map obtained from the time-domain integration module 130, that is, may determine whether each pixel in a bounding box belongs to a foreground or a background.

The tracking module 180 may receive the "n" masked features extracted from the t-th frame time-domain integration feature map obtained from the time-domain integration module 130, and may construct an instance correspondence between frames (e.g., identify instances appearing in a previous frame) using the instance database to which the "m" masked features (e.g., correct masks marked manually and/or in advance during training) extracted from the (t−τ)-th frame time-domain integration feature map.

Finally, the video processing model may combine all information calculated in the four modules (for example, the semantic segmentation module 150, the bounding box module 160, the mask module 170, and the tracking module 180) to obtain a panorama label map.

Figure 2:
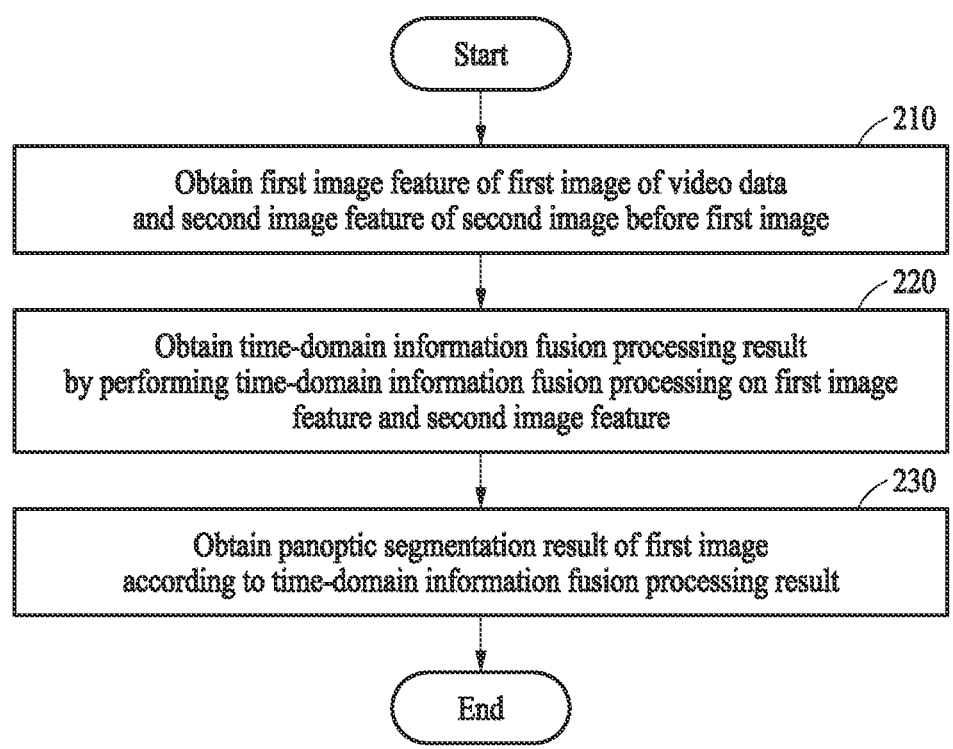
FIG. 2 is a flowchart illustrating an example of a video processing process.

FIG. 2 is a flowchart illustrating an example of a video processing process.

Referring to FIG. 2, in operation 210, a video processing apparatus may obtain a first image feature of a first image of video data and a second image feature of a second image of the video data obtained before the first image.

For example, the video processing apparatus may divide the video data into multiple frame images, and may perform image panoptic segmentation on a first frame image of the video data using all image panoptic segmentation schemes, to obtain a panoptic segmentation result of the first frame image. Frame images next to the first frame image of the video data may be sequentially used as first images, and a video processing method of the present disclosure may be performed to obtain a panoptic segmentation result of each of the frame images next to the first frame image.

When the panoptic segmentation result of the first frame image is obtained, image panoptic segmentation may be performed for each subsequent frame image based on a panoptic segmentation result of each previous frame image.

In an example, in operation 210, the video processing apparatus may extract features for each of the first image (e.g., a t-th frame image) and a second image (e.g., a (t−τ)-th frame image) through a feature extraction network, to obtain the first image feature of the first image and the second image feature of the second image from the video data. In this example, the first image feature and the second image feature may be image features of multiple resolutions, and various different resolutions may be represented using, for example, a pyramid.

In operation 220, the video processing apparatus may obtain a time-domain information fusion processing result by performing time-domain information fusion processing on the first image feature and the second image feature.

The time-domain information fusion processing result may include a first time-domain integration feature of the first image and a second time-domain integration feature of the second image. For example, the time-domain information fusion processing may be performed on the first image feature and the second image feature to obtain the first time-domain integration feature of the first image and the second time-domain integration feature of the second image.

In an example, in performing the time-domain information fusion processing on the first image feature and the second image feature in operation 220, the video processing apparatus may perform a combination operation on the first image feature and the second image feature, may divide combined image features into two paths, may perform correlation processing on a first path, may perform an elementwise addition operation on a second path and a result of the correlation processing of the first path, and may obtain the time-domain information fusion processing result according to an elementwise addition operation result. In this example, in performing the correlation processing on the first path, the video processing apparatus may perform at least one convolution operation on the first path and may perform correlation processing through a spatial-domain fusion network by inputting the convoluted first path to the spatial-domain fusion network.

In operation 220, in performing the combination operation on the first image feature and the second image feature, the video processing apparatus may perform at least one convolution operation on the first image feature, may perform at least one convolution operation on the second image feature, and may perform a combination operation on the convoluted first image feature and the convoluted second image feature.

In operation 220, in obtaining the time-domain information fusion processing result according to the elementwise addition operation result, the video processing apparatus may divide the elementwise addition operation result into two paths, may perform at least one convolution operation on a result of an elementwise addition operation of each of the two paths, may obtain a first time-domain integration feature by performing an elementwise addition operation on the convoluted first image feature and an elementwise addition operation result of the convoluted first path, and may obtain a second time-domain integration feature by performing an elementwise addition operation on the convoluted second image feature and an elementwise addition operation result of the convoluted second path.

In operation 220, in performing the correlation processing through the spatial-domain fusion network, the video processing apparatus may divide features input to the spatial-domain fusion network into at least two paths, may extract subdomains for a portion of or all of the at least two paths, may perform a matrix multiplication operation on a subdomain extraction result, and may perform an elementwise addition operation on a result of the matrix multiplication operation and the feature input to the spatial-domain fusion network.

In operation 220, in performing the correlation processing through the spatial-domain fusion network, the video processing apparatus may divide convoluted combination features into four paths, may extract subdomains for each of a first path, a second path, and a third path among the four paths, may perform a matrix multiplication operation on a subdomain extraction result of the first path and a subdomain extraction result of the second path among the four paths, may perform a matrix multiplication operation on a result of the matrix multiplication operation and a subdomain extraction result of the third path among the four paths, and may perform an elementwise addition operation on a fourth path among the four paths and a result of the matrix multiplication operation for the subdomain extraction result of the third path. In this example, the video processing apparatus may extract the subdomains through data reconstruction.

In operation 220, in obtaining the time-domain information fusion processing result according to the elementwise addition operation result, the video processing apparatus may perform at least one convolution operation on the elementwise addition operation result, and may use addition operation results for each convoluted element and the second image feature as the time-domain information fusion processing result.

A non-limiting example of performing time-domain information fusion processing on the first image feature and the second image feature through a time-domain integration network in operation 220 will be further described below with reference to FIGS. 3 to 6.

In operation 230, the video processing apparatus may obtain a panoptic segmentation result of the first image according to the time-domain information fusion processing result.

In operation 230, the video processing apparatus may obtain an instance correspondence between frames of the first image by performing instance tracking on the first image based on the time-domain information fusion processing result, and may obtain the panoptic segmentation result of the first image according to the instance correspondence between the frames.

In operation 230, the video processing apparatus may perform semantic segmentation, instance segmentation, and bounding box refinement on the first image based on the time-domain information fusion processing result, to obtain a semantic segmentation result of the first image, an instance segmentation result of the first image, and a bounding box of the first image. In this example, in obtaining the panoptic segmentation result of the first image according to the instance correspondence between the frames, the video processing apparatus may fuse the semantic segmentation result, the instance segmentation result and the bounding box of the first image, and the instance correspondence between the frames.

In operation 230, in performing the instance tracking on the first image based on the time-domain information fusion processing result, the video processing apparatus may update an instance database of the video data based on second time-domain integration features and may perform instance tracking for each of first time-domain integration features based on the updated instance database.

In operation 230, in updating the instance database of the video data based on the second time-domain integration features, the video processing apparatus may select a first number (e.g., "m") of preset features from the second time-domain integration features and may add the selected first number of preset features to the instance database of the video data.

In operation 230, in performing the instance tracking for each of the first time-domain integration features based on the updated instance database, the video processing apparatus may select a second number (e.g., "n") of preset features from the first time-domain integration features and may perform an instance correspondence through a tracking network based on the selected second number of preset features and the updated instance database.

In an example, the instance database may record all instances from a first frame of a video to a previous frame of the current frame. The size of the instance database may be a number of instances and may be stored in a dictionary manner. A keyword may be an ID of an instance, and a value may be a corresponding instance feature. An initialization state of the instance database may be a tensor with all zeros.

Reading and writing tasks of the first frame image to the (t−1)-th frame image may need to be performed. If a value corresponding to an ID of an extracted instance indicates an initialization state, the value may be replaced by a current feature. If the value corresponding to the ID of the extracted instance is not in the initialization state, an original feature and a current feature may be fused using a parameter $\alpha$ (e.g., 0.5 (not limited)), which may be represented as "feat_memory_new=$\alpha$×feat_memory_org+(1−$\alpha$)×feat_current". The t-th frame image may be read only, features of all instances in the instance database may be read, and a similarity may be calculated together with the features of all instances detected in the t-th frame image. For example, all similarity models may be selected and, for example, using a vector dot product of two features as a similarity is not limited. For all the instances of the t-th frame image, a predicted ID may be an ID of an instance of the most similar instance database. Through the above scheme, a network may have a sufficiently large instance database during training.

In an example, a preset feature may be a region of interest (ROI) feature, a feature (e.g., an ROI feature) expressed based on a bounding box, or a feature (e.g., a masked feature) expressed based on a mask.

AN ROI feature may represent an instance as a rectangular region (referred to as a "bounding box"), and all information on a feature map of the rectangular region may be regarded as information of a corresponding instance. In general, since a shape of an instance is not a rectangle, a portion of background area information may also be included in instance features, which is not accurate. The masked feature may use a mask of an instance, may use only information of a mask area as instance information, and may remove an influence of a background area.

Here, the feature may be an ROI feature or a masked feature. Since the ROI feature is extracted by a bounding box with a rectangular shape, some background noise may be generated, which may lead to a decrease in a degree of identification of instance features. If the masked feature is selected, the degree of identification of instance features may increase, and accordingly it may be desirable to use the masked feature to increase an accuracy of prediction of an ID of an instance.

Figure 3:
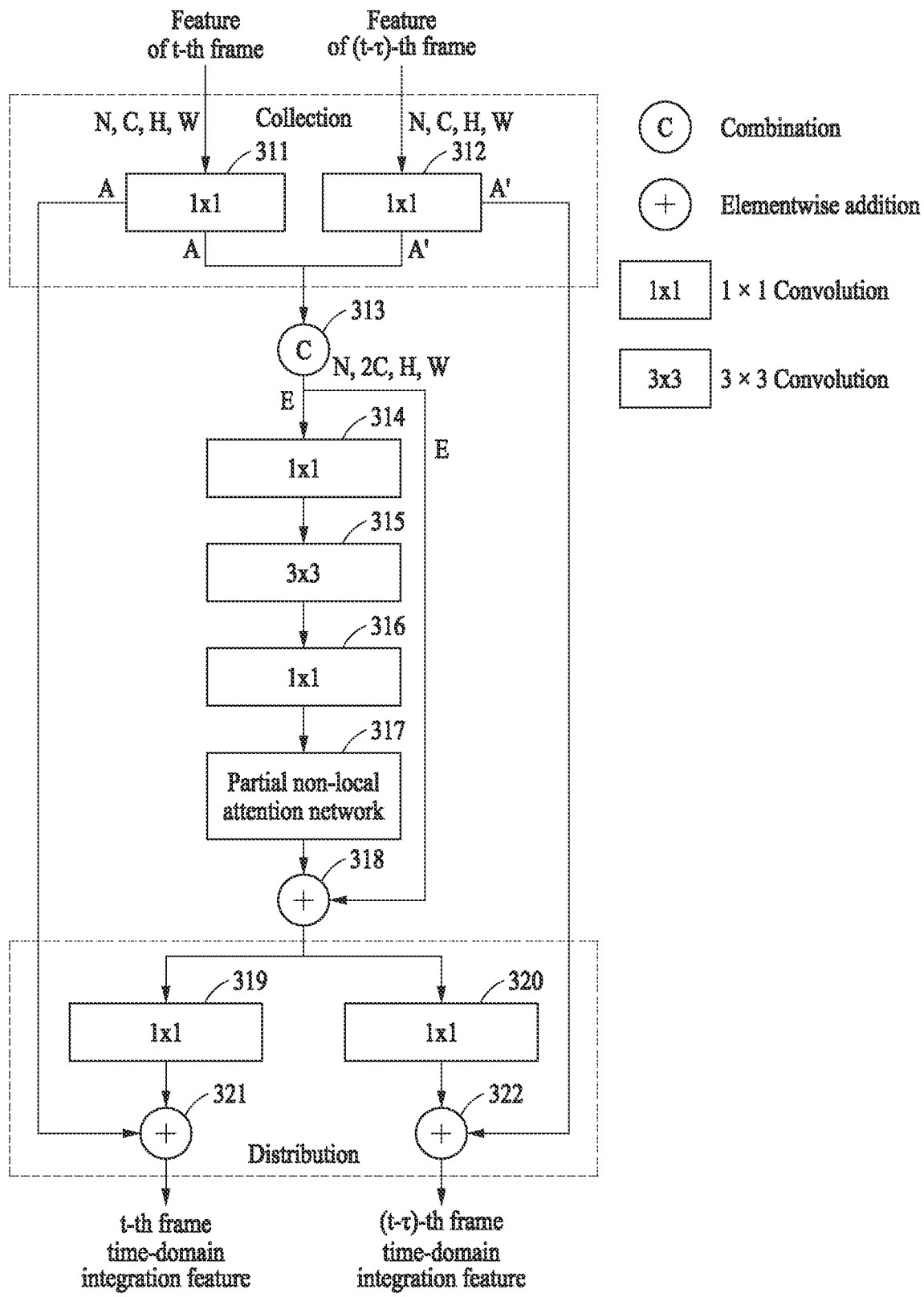
FIG. 3 illustrates an example of a structure of a time-domain integration network and a flow of use thereof.

FIG. 3 illustrates an example of a structure of a time-domain integration network and a flow of use thereof.

Referring to FIG. 3, a time-domain integration network (module) may include a collection portion, a spatial fusion network (e.g., a partial non-local attention network), and a distribution portion. The collection portion may combine features of two frames together as indicated by ©, and the distribution portion may divide combined information passing through an attention network into information of the two frames. The spatial fusion network (e.g., a partial non-local attention network) may be located between the collection portion and the distribution portion. The spatial fusion network, which is a new attention network provided in the present disclosure, may fuse the information of the two frames in a situation in which an optical flow solution and an alignment task according to a related art are not performed.

In FIG. 3, inputs of the time-domain integration network may be a first image feature (e.g., a t-th frame feature map) and a second image feature (e.g., a (t−τ)-th frame feature map), and both feature maps of two frame images may be represented as tensors of N×C×H×W in which N denotes a quantity (that is, a batch size) of image data belonging to the same batch, C denotes a number of channels, and H and W denote a height and a width of a feature map, respectively.

Outputs of the time-domain integration network may be time-domain integration features between two frames. A process of performing time-domain information fusion processing in the time-domain integration network (module) of FIG. 3 may include operations 311 to 322.

In operation 311, the time-domain integration network may perform a convolution operation (e.g., a 1×1 convolution) on the t-th frame feature map to obtain a feature map A.

In operation 312, the time-domain integration network may perform a convolution operation (e.g., a 1×1 convolution) on the (t−τ)-th frame feature map to obtain a feature map A'.

In operation 313, the time-domain integration network may combine the feature maps A and A' to obtain a feature map E. For example, the feature map E may have a size of N×2C×H×W.

In operation 314, the time-domain integration network may perform a convolution operation (e.g., a 1×1 convolution) on the obtained feature map E.

In operation 315, the time-domain integration network may continue to perform a convolution operation (e.g., a 3×3 convolution).

In operation 316, the time-domain integration network may continue to perform a convolution operation (e.g., a 1×1 convolution) to obtain a feature map X.

Here, the convolution operations of operations 314 to 316 may be convolution operations of different parameters.

In operation 317, the time-domain integration network may input the feature map X to the spatial fusion network (e.g., a partial non-local attention network).

In operation 318, the time-domain integration network may perform an elementwise addition operation on a feature map output in operation 317 and the feature map E.

In operation 319, the time-domain integration network may perform a convolution operation (e.g., a 1×1 convolution) on a result output in operation 318.

In operation 320, the time-domain integration network may perform a convolution operation (e.g., a 1×1 convolution) on the result output in operation 318.

Here, the convolution operations of operations 319 and 320 may be convolution operations of different parameters.

In operation 321, the time-domain integration network may perform an elementwise addition operation on a result output in operation 319 and the feature map A, to obtain a time-domain integration feature map of the t-th frame.

In operation 322, the time-domain integration network may perform an elementwise addition operation on a result output in operation 320 and the feature map A', to obtain a time-domain integration feature map of the (t−τ)-th frame.

FIG. 3 illustrates an example of the structure of the time-domain integration network and an example of the flow, and the time-domain integration network may also have another structure for implementing functions, and/or may have other different flows. Examples are not limited to the time-domain integration network of FIG. 3.

Figure 4:
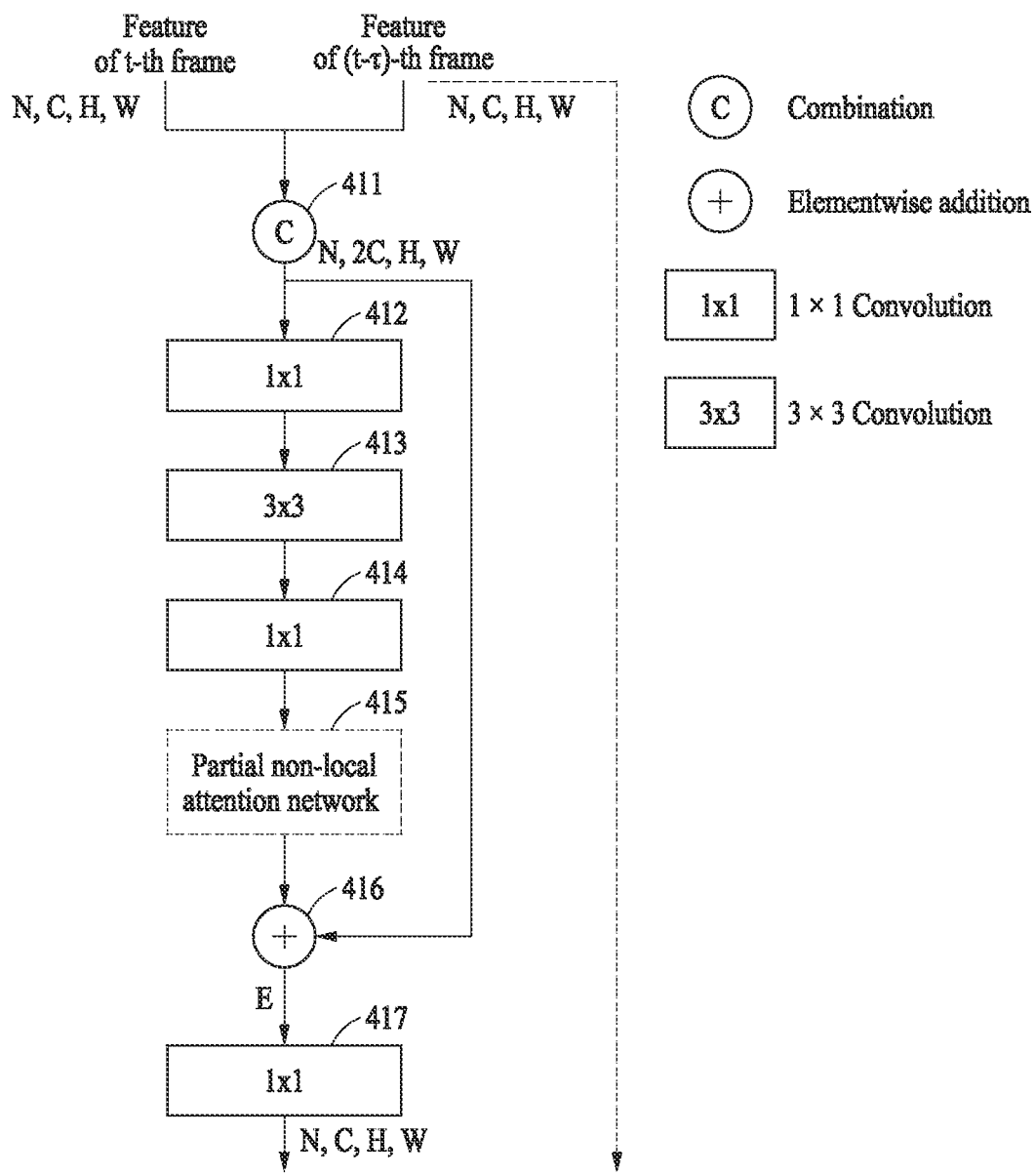
FIG. 4 illustrates an example of a structure of a time-domain integration network and a flow of use thereof.

FIG. 4 illustrates an example of a structure of a time-domain integration network and a flow of use thereof.

Referring to FIG. 4, the time-domain integration network (module) may include a spatial fusion network (e.g., a partial non-local attention network) and may fuse information of two frames in a situation in which the optical flow solution and the alignment task according to the related art are not performed.

In FIG. 4, inputs of the time-domain integration network (module) may be a first image feature and a second image feature, and both feature maps of two frame images may be represented as tensors of N×C×H×W in which N denotes a quantity (that is, a batch size) of image data belonging to the same batch, C denotes a number of channels, and H and W denote a height and a width of a feature map, respectively. Outputs of the time-domain integration network may be time-domain integration features between two frames.

A process of performing time-domain information fusion processing in the time-domain integration network (module) of FIG. 4 may include operations 411 to 417.

In operation 411, the time-domain integration network may combine a t-th frame feature map and a (t−τ)-th frame feature map to obtain a feature map with a size of N×2C×H×W.

In operation 412, the time-domain integration network may perform a convolution operation (e.g., a 1×1 convolution) on a result output in operation 411.

In operation 413, the time-domain integration network may continue to perform a convolution operation (e.g., a 3×3 convolution).

In operation 414, the time-domain integration network may continue to perform a convolution operation (e.g., a 1×1 convolution) to obtain a feature map X.

Here, the convolution operations of operations 412 to 414 may be convolution operations of different parameters.

In operation 415, the time-domain integrated network may input the feature map X to the spatial fusion network (e.g., a partial non-local attention network).

In operation 416, the time-domain integration network may perform an elementwise addition operation on a result output in operation 415 and the result output in operation 411.

In operation 417, the time-domain integration network may perform a convolution operation (e.g., a 1×1 convolution) on a result output in operation 416 to obtain a time-domain integration feature map of the t-th frame. Here, the convolution operation of operation 417 may be a convolution operation of different parameters.

FIG. 4 illustrates an example of the structure of the time-domain integration network and an example of the flow, and the time-domain integration network may also have another structure for implementing functions, and/or may have other different flows. Examples are not limited to the time-domain integration network of FIG. 4.

According to examples, since an optical flow between frames calculated by a typical video processing method does not need to be calculated due to the time-domain integration network of the video processing method of one or more embodiments, a calculation speed may be greatly increased, and a demand for training a quantity of data in the corresponding network is also greatly reduced. In addition, since features of two frames pass through the same attention network in the time-domain integration network of the video processing method of one or more embodiments, semantic consistency may also be enhanced.

Figure 5:
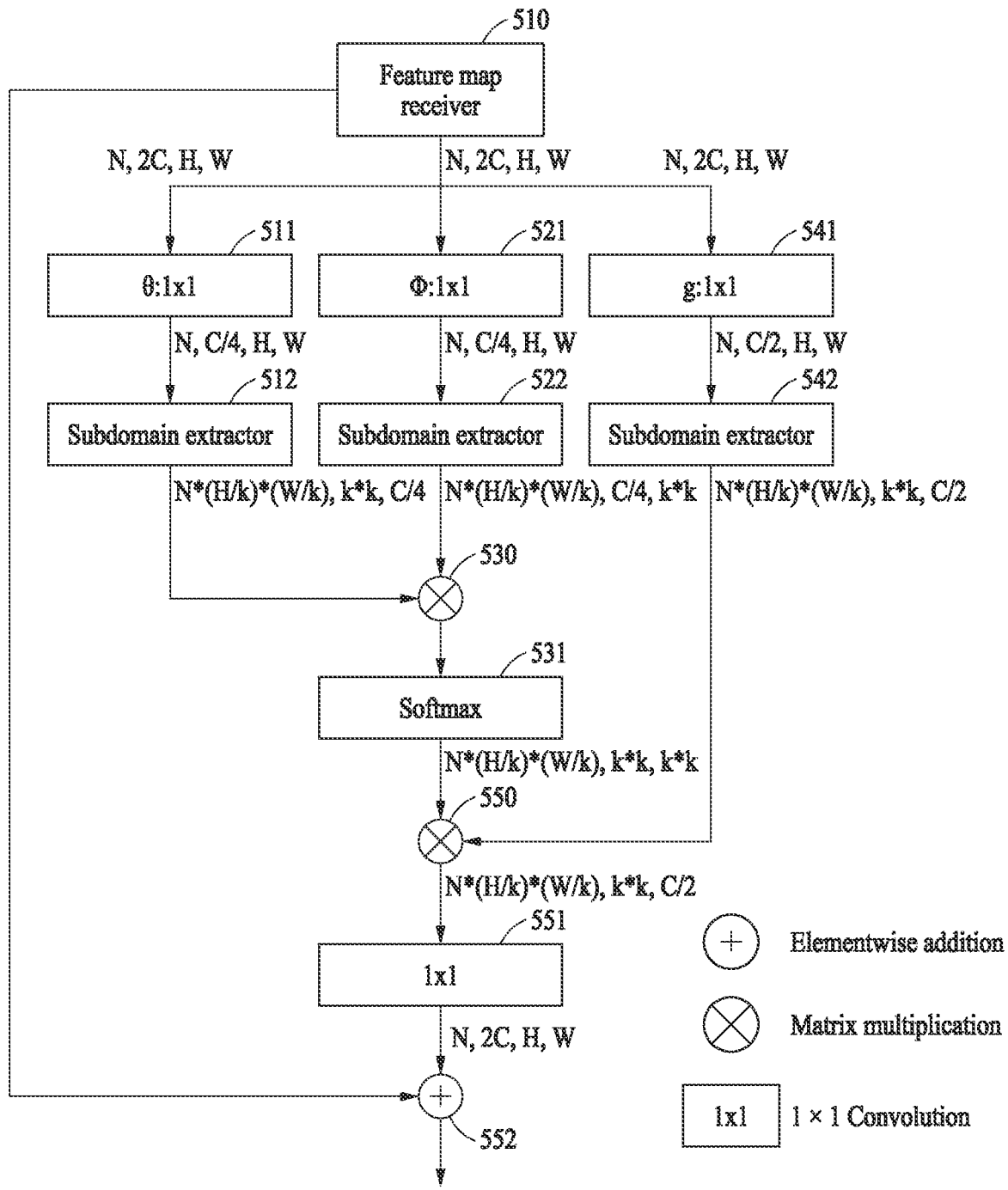
FIG. 5 illustrates an example of a structure of a spatial fusion network in a time-domain integration network.

FIG. 5 illustrates an example of a structure of a spatial fusion network in a time-domain integration network.

Figure 6:
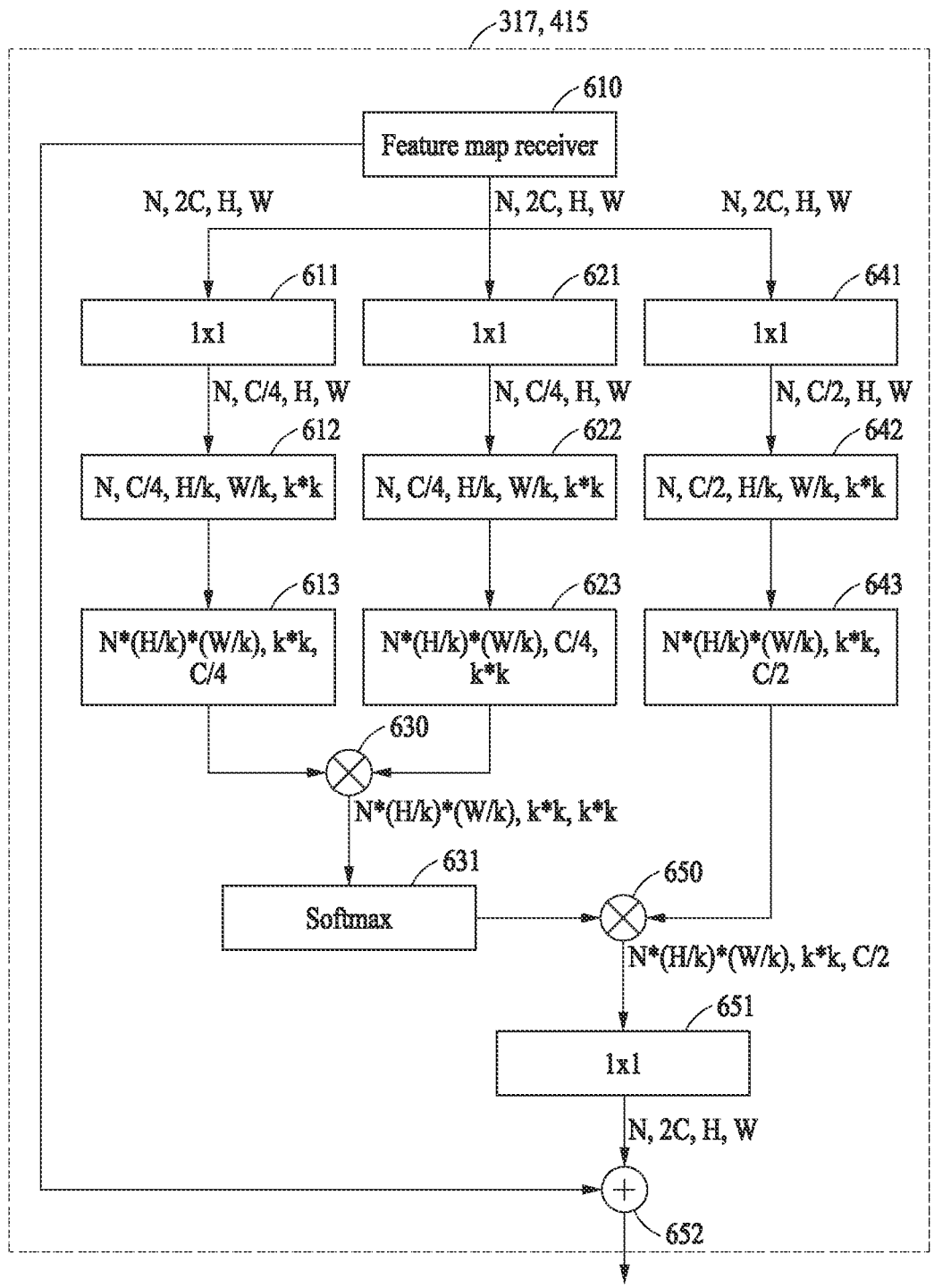
FIG. 6 illustrates an example of a structure of a spatial fusion network in a time-domain integration network and a flow of use thereof.

FIG. 6 illustrates an example of a structure of a spatial fusion network in a time-domain integration network and a flow of use thereof.

Referring to FIG. 5, the spatial fusion network (e.g., a partial non-local attention network) may include a feature map receiver 510, convolution operators 511, 521, 541, and 651, and subdomain extractors 512, 522, and 542, matrix multipliers 530 and 550, a softmax operator 531, and an elementwise adder 552.

As shown in FIG. 5, the spatial fusion network (e.g., a partial non-local attention network) may learn information about an association between frames through a subdomain extraction and a matrix multiplication, and accordingly an alignment task using an optical flow according to the related art may be removed. In FIG. 5, C/4 and C/2 indicate examples of a number of channels, and the number of channels is not limited thereto. An input of the spatial fusion network (e.g., partial non-local attention network) may be a feature map (e.g., the feature map X that is an output of operation 316 of FIG. 3 or an output of operation 414 of FIG. 4), and may have a size of N×2C×H×W, which may be represented by N, 2C, H and W. Here, a subdomain extractor may extract subdomains through a data reconstruction operation. A process in which a spatial fusion network (e.g., a partial non-local attention network) learns information about an association between frames when subdomains are extracted through a data reconstruction operation may include operations 610 to 652, as shown in FIG. 6.

The spatial fusion network may receive the feature map X from operation 316 of FIG. 3 or operation 414 of FIG. 4 in operation 610, and may perform a convolution operation (e.g., a 1×1 convolution) on the feature map X in operation 611.

In operation 612, the spatial fusion network may perform data reconstruction on a feature map obtained in operation 611 to obtain a feature map with a size of N, C/4, H/k, W/k, k×k. Here, C/4 denotes a number of channels, and the number of channels is not limited thereto.

In addition, k denotes a size of a neighboring pixel of a predetermined pixel. For example, k may be set to "16" and a size of a neighboring pixel of each pixel may be "16×16".

In operation 613, the spatial fusion network may perform data reconstruction on the feature map obtained in operation 612, to obtain a feature map with a size of N×(H/k)×(W/k), k×k, C/4. Here, C/4 denotes a number of channels, and the number of channels is not limited thereto.

In operation 621, the spatial fusion network may perform a convolution operation (e.g., a 1×1 convolution) on the feature map X.

In operation 622, the spatial fusion network may perform data reconstruction on a feature map obtained in operation 621, to obtain a feature map with a size of N, C/4, H/k, W/k, k×k. Here, C/4 denotes a number of channels, and the number of channels is not limited thereto.

In operation 623, the spatial fusion network may perform data reconstruction on the feature maps obtained in operation 622, to obtain a feature map with a size of N×(H/k)× (W/k), C/4, k×k. Here, C/4 denotes a number of channels, and the number of channels is not limited thereto.

In operation 641, the spatial fusion network may perform a convolution operation (e.g., a 1×1 convolution) on the feature map X.

In operation 642, the spatial fusion network may perform data reconstruction on a feature map obtained in operation 641 to obtain a feature map with a size of N, C/2, H/k, W/k, k×k. Here, C/2 denotes a number of channels, and the number of channels is not limited thereto.

In operation 643, the spatial fusion network may perform data reconstruction on the feature map obtained in operation 642 to obtain a feature map with a size of N×(H/k)×(W/k), k×k, C/2. Here, C/2 denotes a number of channels, and the number of channels is not limited thereto.

In operation 630, the spatial fusion network may perform a matrix multiplication operation on the feature maps obtained in operation 623 to obtain a feature map with a size of N×(H/k)×(W/k), k×k, k×k.

In operation 631, the spatial fusion network may perform a softmax operation on the feature map obtained in operation 630.

In operation 650, the spatial fusion network may perform a matrix multiplication operation on the feature maps obtained in operations 631 and 643 to obtain a feature map with a size of N×(H/k)×(W/k), k×k, C/2. Here, C/2 denotes a number of channels, and the number of channels is not limited thereto.

In operation 651, the spatial fusion network may continue to perform a convolution operation (e.g., a 1×1 convolution), to obtain a feature map that is restored to a size of N, 2C, H, and W.

In operation 652, the spatial fusion network may perform an elementwise addition operation on the feature map output in operation 651 and the feature map X.

FIGS. 5 and 6 illustrate examples of the structure of the spatial fusion network (e.g., a partial non-local attention network) in the time-domain integration module, and examples of the flow, and the spatial fusion network (e.g., a partial non-local attention network) in the time-domain integration module may also have other structures for implementing functions and/or may have other different flows. Examples are not limited to the spatial fusion networks of FIGS. 5 and 6.

Examples of the video processing method of one or more embodiments has been described above with reference to FIGS. 1 to 6. Hereinafter, an example of a video processing apparatus and examples of components thereof will be described with reference to FIGS. 7 and 8.

Figure 7:
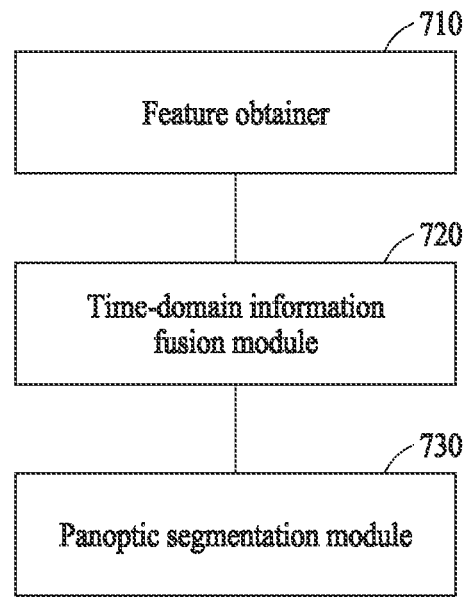
FIG. 7 illustrates an example of a video processing apparatus.

FIG. 7 illustrates an example of a video processing apparatus.

Referring to FIG. 7, the video processing apparatus may include a feature obtainer 710, a time-domain information fusion module 720, and a panoptic segmentation module 730.

The feature obtainer 710 may be configured to obtain a first image feature of a first image and a second image feature of a second image before the first image from video data.

The feature obtainer 710 may be configured to extract features for each of the first image and the second image through a feature extraction network, to obtain the first image feature of the first image and the second image feature of the second image.

The time-domain information fusion module 720 may be configured to obtain a time-domain information fusion processing result by performing time-domain information fusion processing on the first image feature and the second image feature.

The time-domain information fusion processing result may include a first time-domain integration feature of the first image and a second time-domain integration feature of the second image.

The time-domain information fusion module 720 may be configured to perform a combination operation on the first image feature and the second image feature, divide combined image features into two paths, perform correlation processing on a first path, perform an elementwise addition operation on a second path and a result of the correlation processing of the first path, and obtain the time-domain information fusion processing result according to an elementwise addition operation result.

The time-domain information fusion module 720 may be configured to perform at least one convolution operation on the first path, input the convoluted first path to a spatial-domain fusion network, and perform correlation processing through the spatial-domain fusion network.

The time-domain information fusion module 720 may be configured to divide features input to the spatial-domain fusion network into at least two paths, extract subdomains for a portion of or all of the at least two paths, perform a matrix multiplication operation on a subdomain extraction result, and perform an elementwise addition operation on a result of the matrix multiplication operation and the features input to the spatial-domain fusion network.

The time-domain information fusion module 720 may be configured to divide convoluted combination features into four paths, extract subdomains for each of a first path, a second path, and a third path among the four paths, perform a matrix multiplication operation on a subdomain extraction result of the first path and a subdomain extraction result of the second path among the four paths, perform a matrix multiplication operation on a result of the matrix multiplication operation and a subdomain extraction result of the third path among the four paths, and perform an elementwise addition operation on a fourth path among the four paths and a result of the matrix multiplication operation for the subdomain extraction result of the third path.

The time-domain information fusion module 720 may be configured to perform at least one convolution operation on the first image feature, perform at least one convolution operation on the second image feature, and perform a combination operation on the convoluted first image feature and the convoluted second image feature.

The time-domain information fusion module 720 may be configured to divide the elementwise addition operation result into two paths, perform at least one convolution operation on a result of an elementwise addition operation of each of the two paths, obtain a first time-domain integration feature by performing an elementwise addition operation on the convoluted first image feature and an elementwise addition operation result of the convoluted first path, and obtain a second time-domain integration feature by performing an elementwise addition operation on the convoluted second image feature and an elementwise addition operation result of the convoluted second path.

The time-domain information fusion module 720 may be configured to perform at least one convolution operation on the elementwise addition operation result, and use addition operation results for each convoluted element and the second image feature as the time-domain information fusion processing result.

The panoptic segmentation module 730 may be configured to obtain a panoptic segmentation result of the first image according to the time-domain information fusion processing result.

The panoptic segmentation module 730 may be configured to obtain an instance correspondence between frames of the first image by performing instance tracking on the first image based on the time-domain information fusion processing result, and obtain the panoptic segmentation result of the first image according to the instance correspondence between the frames.

Figure 8:
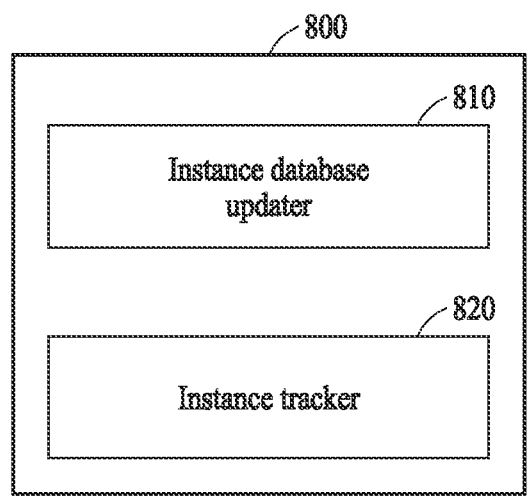
FIG. 8 illustrates an example of a panoptic segmentation module in a video processing apparatus.

FIG. 8 illustrates an example of a panoptic segmentation module in a video processing apparatus.

Referring to FIG. 8, a panoptic segmentation module 800 may include an instance database updater 810 and an instance tracker 820.

The instance database updater 810 may be configured to update an instance database of video data based on second time-domain integration features.

The instance database updater 810 may be configured to select a first number of preset features from the second time-domain integration features and add the selected first number of preset features to the instance database of the video data.

The instance tracker 820 may be configured to perform instance tracking for each of first time-domain integration features based on the updated instance database.

The instance tracker 820 may be configured to select a second number of preset features from the first time-domain integration features and perform an instance correspondence through a tracking network based on the selected second number of preset features and the updated instance database.

In this example, the preset features may include an ROI feature, a feature expressed based on a bounding box, or a feature expressed based on a mask.

In addition, the panoptic segmentation module 800 may be configured to perform semantic segmentation, instance segmentation, and bounding box refinement on a first image, based on a time-domain information fusion processing result, to obtain a semantic segmentation result of the first image, an instance segmentation result of the first image, and a bounding box of the first image, and configured to fuse the semantic segmentation result, the instance segmentation result, the bounding box, and an instance correspondence between frames of the first image to obtain a panoptic segmentation result of the first image.

The video processing apparatus has been described above with reference to FIGS. 7 and 8. Next, an example of an electronic device will be described with reference to FIG. 9.

Figure 9:
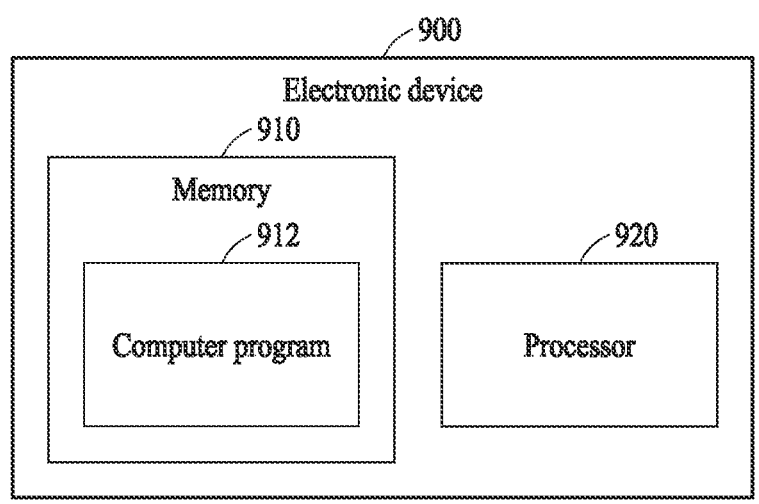
FIG. 9 illustrates an example of an electronic device.

FIG. 9 illustrates an example of an electronic device.

Referring to FIG. 9, an electronic device 900 may include a memory 910 (e.g., one or more memories) and a processor 920 (e.g., one or more processors). A computer program 912 may be stored in the memory 910. When the computer program 912 is executed by the processor 920, any or all operations of the video processing methods described above according to examples may be implemented.

When the computer program 912 is executed by the processor 920, an operation of obtaining a first image feature of a first image of video data and a second image feature of a second image before the first image, an operation of obtaining a time-domain information fusion processing result by performing time-domain information fusion processing on the first image feature and the second image feature, and an operation of obtaining a panoptic segmentation result of the first image according to the time-domain information fusion processing result may be implemented.

The electronic device 900 of FIG. 9 is an example and is not intended to suggest any limitation as to the scope of use or functionality of examples of the disclosure.

The video processing method and apparatus have been described above with reference to FIGS. 1 to 9. However, the video processing apparatus and components thereof shown in FIGS. 7 and 8 may each be configured with hardware or a combination of hardware and software to perform a predetermined function. The electronic device 900 of FIG. 9 is not limited to including the above-described components, some components may be added or deleted as necessary, and components may also be combined.

In a video processing apparatus and method of one or more embodiments, a first image feature of a first image of video data and a second image feature of a second image before the first image may be obtained, a time-domain information fusion processing result may be obtained by performing time-domain information fusion processing on the first image feature and the second image feature, and a panoptic segmentation result of the first image may be obtained according to the time-domain information fusion processing result. Thus, video processing apparatus and method of one or more embodiments may lower costs for video processing and increase a speed and an accuracy of video processing. In addition, an artificial intelligence (AI) network may be used to perform time-domain information fusion processing. The video processing method according to the examples may be implemented through AI. An AI-based video processing method may be provided for application fields that require a global view of video segmentation, for example, autonomous driving, augmented reality, or video editing. Through the video processing apparatus and method of one or more embodiments, an effect and speed for automatic recognition of an environment around an autonomous vehicle may be enhanced, and thus a safety of autonomous driving may be enhanced.

The video processing apparatuses, feature obtainers, time-domain information fusion modules, panoptic segmentation modules, panoptic segmentation modules, instance database updaters, instance trackers, electronic devices, memories, processors, feature obtainer 710, time-domain information fusion module 720, panoptic segmentation module 730, panoptic segmentation module 800, instance database updater 810, instance tracker 820, electronic device 900, memory 910, processor 920, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with video processing, the method comprising:
    determining a first image feature of a first image of video data and a second image feature of a second image that is previous to the first image;
    determining a time-domain information fusion processing result by performing time-domain information fusion processing on the first image feature and the second image feature; and
    determining a panoptic segmentation result of the first image based on the time-domain information fusion processing result, wherein the time-domain information fusion processing result comprises a first time-domain integration feature of the first image feature and a second time-domain integration feature of the second image feature.

2. The method of claim 1, wherein the determining of the panoptic segmentation result of the first image based on the time-domain information fusion processing result comprises:
    determining an instance correspondence between frames of the first image by performing instance tracking on the first image based on the time-domain information fusion processing result; and
    determining the panoptic segmentation result of the first image based on the instance correspondence between the frames of the first image.

3. The method of claim 2, wherein the determining of the panoptic segmentation result of the first image based on the time-domain information fusion processing result comprises performing semantic segmentation, instance segmentation, and bounding box refinement on the first image based on the time-domain information fusion processing result to determine a semantic segmentation result of the first image, an instance segmentation result of the first image, and a bounding box of the first image, and
    wherein the determining of the panoptic segmentation result of the first image based on the instance correspondence between the frames of the first image comprises fusing the semantic segmentation result of the first image, the instance segmentation result of the first image, the bounding box of the first image, and the instance correspondence between the frames of the first image to determine the panoptic segmentation result of the first image.

4. The method of claim 1, wherein the determining of the first image feature of the first image and the second image feature of the second image comprises extracting features for each of the first image and the second image through a feature extraction network to determine the first image feature of the first image and the second image feature of the second image.

5. The method of claim 1, wherein the determining of the time-domain information fusion processing result by performing the time-domain information fusion processing on the first image feature and the second image feature comprises:
    performing a combination operation on the first image feature and the second image feature to generate combined image features;
    dividing the combined image features into two paths and performing correlation processing on a first path;
    performing an elementwise addition operation on a second path and a result of the correlation processing of the first path; and
    determining the time-domain information fusion processing result based on an elementwise addition operation result.

6. The method of claim 5, wherein the dividing of the combined image features into the two paths and performing of the correlation processing on the first path comprises:
    performing one or more convolution operations on the first path; and
    performing correlation processing through a spatial-domain fusion network by inputting the convoluted first path to the spatial-domain fusion network.

7. The method of claim 6, wherein the performing of the correlation processing through the spatial-domain fusion network comprises:
    dividing features input to the spatial-domain fusion network by two or more paths and extracting subdomains for a portion of or all of the two or more paths;

performing a matrix multiplication operation on a subdomain extraction result; and
performing an elementwise addition operation on a result of the matrix multiplication operation and the features input to the spatial-domain fusion network.

8. The method of claim 6, wherein the performing of the correlation processing through the spatial-domain fusion network comprises:
dividing convoluted combination features into four paths;
extracting subdomains for each of a first path, a second path, and a third path among the four paths;
performing a matrix multiplication operation on a subdomain extraction result of the first path and a subdomain extraction result of the second path among the four paths, and performing a matrix multiplication operation on a result of the matrix multiplication operation and a subdomain extraction result of the third path among the four paths; and
performing an elementwise addition operation on a fourth path among the four paths and a result of the matrix multiplication operation for the subdomain extraction result of the third path.

9. The method of claim 8, wherein the extracting of the subdomains comprises extracting the subdomains through data reconstruction.

10. The method of claim 5, wherein the performing of the combination operation on the first image feature and the second image feature comprises:
performing one or more convolution operations on the first image feature;
performing one or more convolution operations on the second image feature; and
performing a combination operation on the convoluted first image feature and the convoluted second image feature.

11. The method of claim 10, wherein the determining of the time-domain information fusion processing result based on the elementwise addition operation result comprises:
dividing the elementwise addition operation result into two paths;
performing one or more convolution operations on a result of an elementwise addition operation of each of the two paths;
determining the first time-domain integration feature by performing an elementwise addition operation on the convoluted first image feature and an elementwise addition operation result of the convoluted first path; and
determining the second time-domain integration feature by performing an elementwise addition operation on the convoluted second image feature and an elementwise addition operation result of the convoluted second path.

12. The method of claim 5, wherein the determining of the time-domain information fusion processing result based on the elementwise addition operation result comprises performing one or more convolution operations on the elementwise addition operation result, and using addition operation results for each convoluted element and the second image feature as the time-domain information fusion processing result.

13. The method of claim 2, wherein the time-domain information fusion processing result comprises first time-domain integration features of the first image feature and second time-domain integration features of the second image feature, and
wherein the determining of the instance correspondence between the frames of the first image by performing the instance tracking on the first image based on the time-domain information fusion processing result comprises:
updating an instance database of the video data based on the second time-domain integration features; and
performing instance tracking for each of the first time-domain integration features based on the updated instance database.

14. The method of claim 13, wherein the updating of the instance database of the video data based on the second time-domain integration features comprises:
selecting a first number of preset features from the second time-domain integration features; and
adding the selected first number of preset features to the instance database of the video data.

15. The method of claim 13, wherein the performing of the instance tracking for each of the first time-domain integration features based on the updated instance database comprises:
selecting a second number of preset features from the first time-domain integration features; and
performing an instance correspondence through a tracking network based on the selected second number of preset features and the updated instance database.

16. The method of claim 14, wherein the preset features comprise any one or any combination of any two or more of a region of interest (ROI) feature, a feature expressed based on a bounding box, and a feature expressed based on a mask.

17. A non-transitory computer-readable storage medium storing instructions that, when executed by one or more processors, configure the one or more processors to perform the method of claim 1.

18. An apparatus with video processing, the apparatus comprising:
one or more processors configured to:
determine a first image feature of a first image of video data and a second image feature of a second image that is previous to the first image;
determine a time-domain information fusion processing result by performing time-domain information fusion processing on the first image feature and the second image feature; and
determine a panoptic segmentation result of the first image based on the time-domain information fusion processing result, wherein the time-domain information fusion processing result comprises a first time-domain integration feature of the first image feature and a second time-domain integration feature of the second image feature.

19. The apparatus of claim 18, wherein, for the determining of the panoptic segmentation result, the one or more processors are configured to:
determine an instance correspondence between frames of the first image by performing instance tracking on the first image based on the time-domain information fusion processing result; and
determine the panoptic segmentation result of the first image based on the instance correspondence between the frames of the first image.

* * * * *